United States Patent
Kim et al.

(10) Patent No.: US 8,587,676 B2
(45) Date of Patent: Nov. 19, 2013

(54) DIGITAL IMAGE PROCESSING APPARATUS INCLUDING HANDSHAKE CORRECTION MODULE AND METHODS OF CONTROLLING THE DIGITAL IMAGE PROCESSING APPARATUS

(75) Inventors: Sung-min Kim, Suwon-si (KR); Jin-gi Lee, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 13/157,444

(22) Filed: Jun. 10, 2011

(65) Prior Publication Data

US 2012/0162455 A1 Jun. 28, 2012

(30) Foreign Application Priority Data

Dec. 23, 2010 (KR) ........................ 10-2010-0133719

(51) Int. Cl.
*H04N 5/228* (2006.01)

(52) U.S. Cl.
USPC .................. 348/208.7; 348/208.4; 348/208.1; 348/208.99

(58) Field of Classification Search
USPC ...................... 348/208.99–208.16; 396/52–55
See application file for complete search history.

(56) References Cited

U.S. PATENT DOCUMENTS

| | | | | |
|---|---|---|---|---|
| 5,539,496 A * | 7/1996 | Wakabayashi et al. | ......... | 396/55 |
| 5,978,598 A * | 11/1999 | Ishikawa | ........................ | 396/50 |
| 6,151,068 A * | 11/2000 | Ikeda | ...................... | 348/208.99 |
| 7,589,892 B2 * | 9/2009 | Tohma et al. | ................. | 359/379 |
| 7,830,444 B2 * | 11/2010 | Matsumoto | ................... | 348/340 |
| 8,098,286 B2 * | 1/2012 | Nakakuki et al. | .......... | 348/208.1 |
| 8,120,691 B2 * | 2/2012 | Yu | ............................. | 348/333.01 |
| 8,158,918 B2 * | 4/2012 | Irie | ............................. | 250/206.1 |
| 2004/0189484 A1 * | 9/2004 | Li | ............................ | 340/825.19 |
| 2005/0052538 A1 * | 3/2005 | Sato et al. | .................. | 348/208.1 |
| 2005/0174465 A1 * | 8/2005 | Akada | ........................... | 348/335 |
| 2005/0274869 A1 * | 12/2005 | Yamauchi et al. | ......... | 250/201.5 |
| 2005/0283972 A1 * | 12/2005 | Ueno et al. | ...................... | 29/740 |
| 2007/0159687 A1 * | 7/2007 | Tohma et al. | ................. | 359/368 |
| 2007/0242950 A1 * | 10/2007 | Tenmyo | ........................ | 396/463 |
| 2008/0151065 A1 * | 6/2008 | Okumura et al. | .......... | 348/208.4 |
| 2008/0298791 A1 * | 12/2008 | Noda | .............................. | 396/55 |
| 2009/0067829 A1 * | 3/2009 | Li et al. | ........................ | 396/135 |
| 2009/0115859 A1 * | 5/2009 | Lee | .............................. | 348/208.4 |
| 2009/0128638 A1 * | 5/2009 | Okada | ........................ | 348/208.2 |
| 2009/0167879 A1 * | 7/2009 | Ohno | ........................ | 348/208.12 |
| 2009/0213233 A1 * | 8/2009 | Kido | ............................ | 348/208.4 |
| 2009/0295858 A1 * | 12/2009 | Ito et al. | ........................... | 347/17 |
| 2010/0002089 A1 * | 1/2010 | Jang | ........................... | 348/208.99 |
| 2010/0026820 A1 * | 2/2010 | Senoo | ........................ | 348/208.7 |
| 2010/0202765 A1 * | 8/2010 | Ohishi | ............................. | 396/55 |
| 2010/0238004 A1 * | 9/2010 | Mizoguchi | ................. | 340/407.1 |
| 2010/0325825 A1 * | 12/2010 | Kawai | .............................. | 15/94 |
| 2011/0074963 A1 * | 3/2011 | Awazu et al. | .............. | 348/208.4 |
| 2011/0171937 A1 * | 7/2011 | Hill et al. | .................... | 455/412.2 |
| 2012/0092508 A1 * | 4/2012 | Toriumi et al. | ............. | 348/207.1 |
| 2012/0113280 A1 * | 5/2012 | Stupak et al. | ........... | 348/208.99 |
| 2012/0133308 A1 * | 5/2012 | Elenga et al. | ................. | 318/128 |

* cited by examiner

*Primary Examiner* — Lin Ye
*Assistant Examiner* — Chia-Wei A Chen
(74) *Attorney, Agent, or Firm* — Drinker Biddle & Reath LLP

(57) ABSTRACT

A digital image processing apparatus and a method of controlling the digital image processing apparatus, the method including: generating a live view image; performing a preprocessing operation on the live view image; driving a vibration mode of a handshake correction module in response to a result of the preprocessing operation; and if a photographing signal is input, generating a photographing image after terminating the vibration mode of the handshake correction module.

16 Claims, 5 Drawing Sheets

DIGITAL IMAGE PROCESSING APPARATUS INCLUDING HANDSHAKE CORRECTION MODULE AND METHODS OF CONTROLLING THE DIGITAL IMAGE PROCESSING APPARATUS

CROSS-REFERENCE TO RELATED PATENT APPLICATION

This application claims the priority benefit of Korean Patent Application No. 10-2010-0133719, filed on Dec. 23, 2010 in the Korean Intellectual Property Office, which is hereby incorporated by reference in its entirety.

BACKGROUND

1. Field of the Invention

The disclosure relates to digital image processing apparatus including a handshake correction module and digital image processing methods of controlling the digital image processing apparatus.

2. Description of the Related Art

When digital cameras are used to perform photography, various preprocessing operations may be performed before photographing begins. For example, various operations, such as auto-focusing, auto-exposure control, auto white balance control, auto-flash on/off, subject recognition, scene recognition, etc., are performed. Users need to recognize whether such preprocessing operations have been successfully performed in order to obtain desired images. Thus, traditional digital cameras notify users of results of such preprocessing operations through user interfaces and alarm sounds. However, since digital cameras display user interfaces on screens of limited size and/or on screens with limited brightness, users can easily overlook user interfaces due to surrounding brightness. Moreover, users may have difficulty recognizing alarm sounds in noisy environments.

SUMMARY

This disclosure describes digital image processing apparatus that allow a photographer to precisely recognize results of preprocessing operations performed before photographing begins irrespective of surroundings and methods of controlling the digital image processing apparatus.

According to an embodiment, there is provided a method of controlling a digital image processing apparatus, the method including: generating a live view image; performing a preprocessing operation on the live view image; driving a vibration mode of a handshake correction module in response to a result of the preprocessing operation; and if a photographing signal is input, generating a photographic image after terminating the vibration mode of the handshake correction module.

The processing operation may include at least one of auto-focusing, auto-exposure control, auto-white balance (AWB) control, auto-flash control, or subject recognition.

The method may further include, if the preprocessing operation has failed, initializing the vibration mode of the handshake correction module.

The initializing of the vibration mode of the handshake correction module may include moving a driving unit of the handshake correction module to a specific position.

The driving of the vibration mode of the handshake correction module may include vibrating a driving unit of the handshake correction module at a predetermined amplitude and frequency for a predetermined period of time.

If the predetermined frequency is 200 cycles per second (Hz), the predetermined amplitude may be below ⅕ of a maximum handshake correction amplitude of the handshake correction module.

If the photographic image is input during the driving of the vibration mode of the handshake correction module, the photographic image may be generated after stopping the vibration mode of the handshake correction module.

The method may further include: performing a handshake correction operation on the photographic image.

The driving of the vibration mode of the handshake correction module may include vibrating a driving unit of the handshake correction module with respect to a single axis, and wherein the performing of the handshake correction operation includes moving the driving unit of the handshake correction module with respect to plural axes.

According to another embodiment, there is provided a digital image processing apparatus including: a live view image generation unit to generate a live view image; a preprocessing unit to perform a preprocessing operation on the live view image; a handshake correction module to drive a vibration mode in response to a result of the preprocessing operation; and a photographic image generation unit to, if a photographing signal is input, generate a photographic image after terminating the vibration mode of the handshake correction module.

The processing unit may perform at least one of auto-focusing, auto-exposure control, auto-white balance (AWB) control, auto-flash control, or subject recognition.

The handshake correction module may drive the vibration mode after initializing the vibration mode of the handshake correction module.

The handshake correction module may move a driving unit thereof to a specific position.

The handshake correction module may vibrate a driving unit thereof at a predetermined amplitude and frequency for a predetermined period of time.

If the predetermined frequency is 200 Hz, the predetermined amplitude may be below ⅕ a maximum handshake correction amplitude of the handshake correction module.

If the photographic image is input during driving of the vibration mode of the handshake correction module, the photographic image generation unit may generate the photographic image after stopping the vibration mode of the handshake correction module.

The handshake correction module may perform a handshake correction operation on the photographic image.

The handshake correction module may drive the driving unit in the vibration mode with respect to a single axis and in a handshake correction mode with respect to plural axes.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Embodiments of the invention will be described below in more detail with reference to the accompanying drawings.

Figure 1:
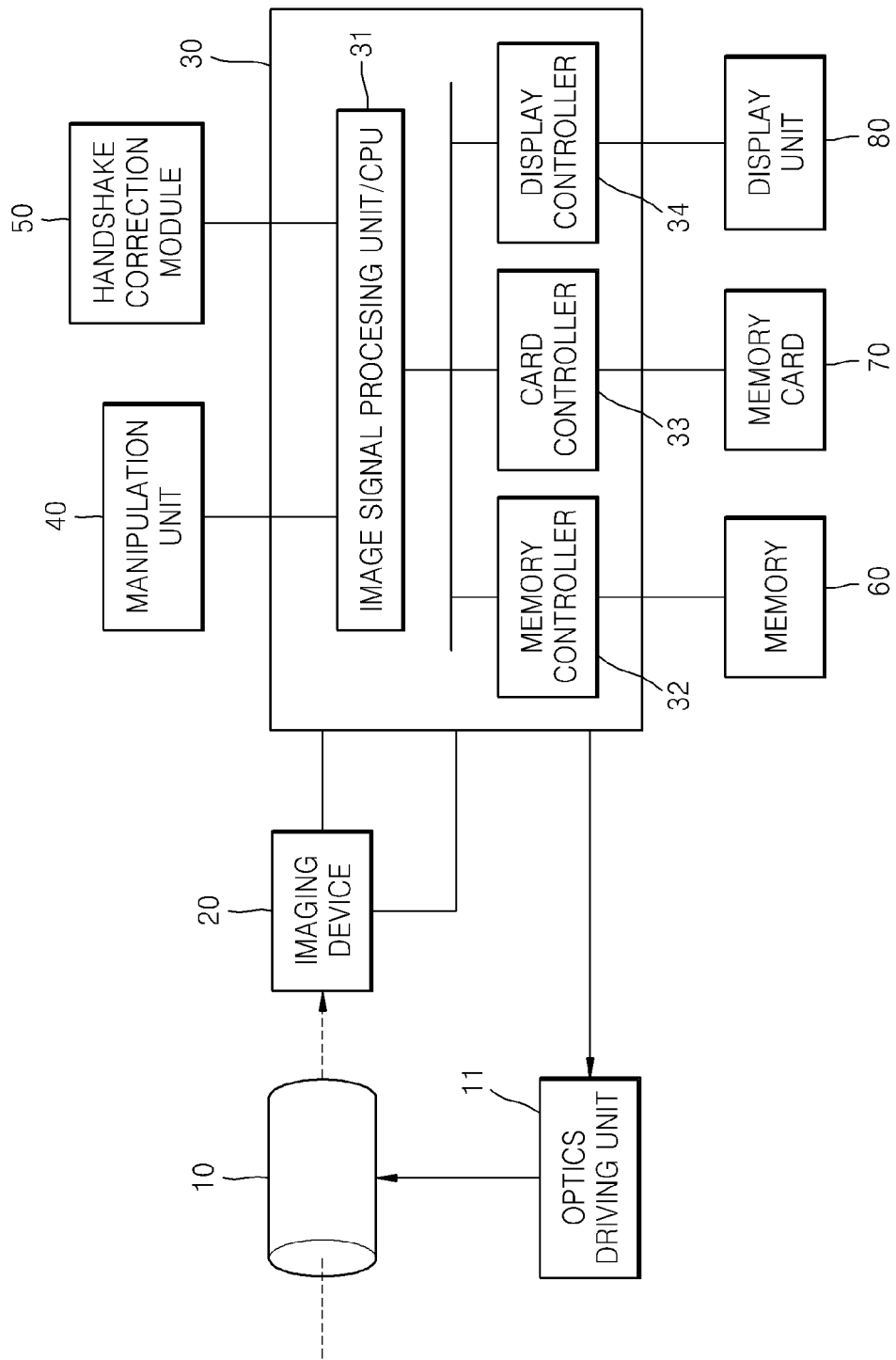
FIG. 1 is a block diagram illustrating a digital camera that is an example of a digital image processing apparatus, according to an embodiment.

FIG. 1 is a block diagram illustrating a digital camera as an example of a digital image processing apparatus, according to an embodiment.

As an example of the digital image processing apparatus, a digital camera will be described. However, the digital image processing apparatus of the invention is not limited to the digital camera shown in FIG. 1, and the invention may be applied to digital appliances such as video cameras, personal digital assistants (PDAs) in which the digital image photographing apparatus is embedded, TV sets, digital album frames, camera phones, portable multimedia players (PMPs), etc.

Referring to FIG. 1, the digital camera includes optics 10, an optics driving unit 11, and an imaging device 20.

The optics 10 includes an image forming optics system for concentrating an optical signal from an object, a shutter, and an iris. The image forming optics system includes a focus lens for focusing on the object and a zoom lens for changing a focal length.

The optics driving unit 11 may include a focal lens driving unit for driving a position of the focus lens, an iris driving unit for driving opening/closing of the iris, and a shutter driving unit for driving opening/closing of the shutter.

The imaging device 20 includes an imaging device that captures image light that passes through the image forming optics system of a fixed and/or an exchangeable lens and generates an image signal. The imaging device 20 may include a plurality of photoelectric conversion units that are arranged in a matrix, a vertical and/or horizontal transmission path that moves charges from the photoelectric conversion units in synchronization with a timing signal and obtains an image signal, etc. Examples of the imaging device 20 are a charge-coupled device (CCD) sensor and a complementary metal-oxide semiconductor (CMOS) sensor. Furthermore, when the CCD sensor is used as the imaging device 20, the imaging device 20 may include a correlated double sampling (CDS)/amplifier (AMP) that eliminates low frequency noise included in an electric signal output by the imaging device 20 and amplifies the electric signal to a predetermined level, and an analog-digital (AD) converter that performs digital conversion on an electric signal output by the CDS/AMP to generate a digital signal.

The digital camera further includes a camera controller 30. The camera controller 30 includes an image signal processing unit/CPU 31.

The image signal processing unit/CPU 31 may calculate an auto white balance (AWB) evaluation value for white balance (WB), an auto evaluation value for automatic exposure (AE), and an auto focusing (AF) evaluation value for AF with respect to an image signal input from the imaging device 20, and appropriately control WB, AE, and AF according to the calculated evaluation values. The image signal processing unit/CPU 31 may perform various application operations such as object recognition (e.g., face recognition, scene recognition, etc.) with respect to the input image signal. The image signal processing unit/CPU 31 may perform image processing for record (e.g., storage) and image processing for display. Examples of the image processing are gamma correction, color filter array interpolation, color matrix, color correction, and color enhancement. Compression processing in a JPEG (Joint Photographic Coding Experts Group) compression or LZW (Lempel-Ziv Welch) compression format may be performed for record or image storage.

In the present embodiment, the image signal processing unit/CPU 31 generates a live view image, performs preprocessing on the live view image, and controls generation of a photographic image when a photographing signal is received and/or input by a user. However, if the preprocessing has failed, the image signal processing unit/CPU 31 controls driving of a vibration mode of a handshake correction module 50 and terminates the vibration mode of the handshake correction module 50 when the photographing signal is received. This will be described in more detail with reference to the following drawings.

The camera controller 30 further includes a memory controller 32, a card controller 33, and a display controller 34.

The memory controller 32 may temporarily store a photographic image, various types of information, etc. in a memory 60, or may output a photographic image, various types of information, etc. from the memory 60. The memory controller 32 may read program information stored in the memory 60. The memory 60 is a buffer memory that temporarily stores a photographic image, various types of information, etc., and may include an SRAM, an SDRAM, etc. The memory 60 may include a flash memory, ROM, etc. as storage units that store programs.

The card controller 33 may store an image file in a memory card 70 and read an image file from the memory card 70. The card controller 33 may also control reading and storage of various types of information that is to be preserved. The memory card 70 may include an SD card, etc. Although the memory card 70 is used as a storage medium in the present embodiment, the invention is not limited thereto. The memory card 70 may store an image file and various types of information in any number and/or type(s) of storage and/or recording media such as an optical disc (a compact disc (CD), a digital versatile disc (DVD), a Blu-ray disc, or the like), an optical-magnetic disk, and/or a magnetic disk. When the memory card 70 uses such a recording medium, the memory card 70 may further include a device for reading the recording medium.

The display controller 34 may control image and/or control information presentation and/or display on a display unit 80. The display unit 80 may include a first display unit installed in one surface of the digital camera, for example, a front surface on which the exchangeable and/or fixed lens is mounted. The display controller 34 may further include a second display unit and an electronic view finder (EVF) that are installed in another surface of the digital camera, for example, a back surface opposite to the front surface, for confirming an image and various types of information. The display controller 34 may control image display of the second display unit, the EVF, and the first display unit. The display controller 34 may control the first display unit, the second display unit, and the EVF together or individually. The display unit 80 may include a liquid crystal display (LCD), an organic light emitted diode (OLED), etc.

The digital camera includes a manipulation unit 40, via which control signals of a user are input and/or received. The manipulation unit 40 may include a component used to manipulate the digital camera and select various photographing settings. For example, the manipulation unit 40 may be embodied as a button, a key, a touch panel, a touch screen, or a dial, and user control signals for various functions such as turning power on/off, starting/stopping photographing, starting/stopping/searching playback, driving optics, switching modes, navigating menus, and inputting selections may be input and/or received via the manipulation unit 40. For example, a shutter button may be half-pressed, fully pressed, or released by the user. A manipulation signal for starting focus control is output when the shutter button is half-pressed (S1), and the focus control is terminated when the shutter button is released. The shutter button may output a manipulation signal for starting photographing when the shutter button is fully pressed (S2). The manipulation signals may be transmitted to the image signal processing unit/CPU 30, and thus corresponding components may be driven.

The digital camera includes the handshake correction module 50. The handshake correction module 50 detects a movement of the digital camera due to, for example, handshake, compares a signal corresponding to the detected movement with a reference signal, calculates a handshake correction amount, and corrects the handshake by driving the imaging device 20 and/or the optics 10 according to the handshake correction amount. The handshake correction module 50 will be described in more detail with reference to FIGS. 2 and 3.

Figure 2:
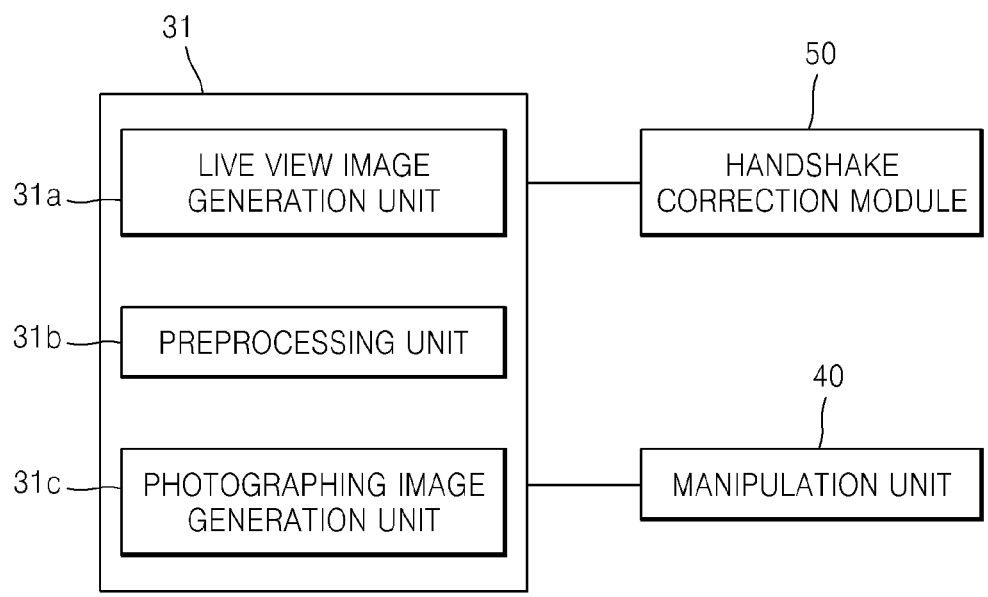
FIG. 2 is a block diagram illustrating an example image signal processing unit/CPU, a handshake correction module, and an operation unit of the digital camera of FIG. 1.

FIG. 2 is a block diagram illustrating the image signal processing unit/CPU 31, the handshake correction module 50, and the manipulation unit 40 of the digital camera of FIG. 1.

Referring to FIGS. 1 and 2, the image signal processing unit/CPU 31 includes a live view image generation unit 31a that generates a live view image, and a preprocessing unit 31b that performs preprocessing on the live view image. The preprocessing unit 31b may perform AF, AE control, AWB control, auto-flash control, object recognition processing, and the like. For example, the preprocessing unit 31b may determine that preprocessing has failed if the preprocessing unit 31b fails to focus the focus lens after performing AF on the live view image. Additionally or alternatively, when the preprocessing unit 31b determines that exposure is insufficient or excessive after performing AE control, the preprocessing unit 31b may determine that preprocessing has failed. Further still, if the preprocessing unit 31b has failed to recognize an object after object recognition processing, e.g., a face region is not detected, failed to obtain suitable WB value after performing AWB control, or failed to turn on or off auto-flash after auto-flash control, the preprocessing unit 31b may determine that preprocessing has failed.

If preprocessing has failed, the vibration mode of the handshake correction module 50 may be driven. The handshake correction module 50 may drive the vibration mode after initializing the vibration mode. Initialization of the vibration mode means that an initial position of a driving unit 55 (FIG. 3) is moved to a specific position, and then the driving unit 55 may vibrate at a predetermined amplitude and frequency around the specific position with respect to one axis. For example, the driving unit 55 may vibrate around a center or default position after the driving unit 55 moves to the center or default position. In the present embodiment, the driving unit 55 vibrates with respect to one axis for a user to sense vibrations. However, the invention is not limited thereto, and the driving unit 55 may vibrate with respect to two or more axes. Further, the handshake correction module 50 may vibrate the driving unit 55 in the vibration mode at a frequency of 200 Hz and at an amplitude less than ⅕ of a maximum handshake correction amplitude in the vibration mode. In addition, the amplitude in the vibration mode may be a minimum amplitude that is detectable by the user.

The image signal processing unit/CPU 31 further includes a photographic image generating unit 31c. When a photographing signal is input and/or received, for example, when the shutter release button is fully pressed (S2), the photographic image generating unit 31c terminates the vibration mode and generates a photographic image. For example, the photographic image generation unit 31c may control opening and closing of the shutter when a user inputs the photographing signal. Thus, the shutter may be used to generate the photographic image. In the present embodiment, since the vibration mode of the handshake correction module 50 is driven to inform, notify and/or alert the user that preprocessing has and/or may have failed, if photographing is performed after preprocessing has been successfully performed, an operation of terminating the vibration mode may not be unnecessarily performed. However, the vibration mode of the handshake correction module 50 is to be terminated before the photographic image is generated according to the photographing signal. For example, if the photographing signal is input before a preprocessing operation has been completely performed, the vibration mode is driven and then the photographic image is generated after the vibration mode of the handshake correction module 50 is terminated in order to perform photographing according to the photographing signal. For another example, if the photographing signal is input while the preprocessing operation is being performed, the vibration mode is driven, the preprocessing operation is completely performed, and then the vibration mode of the handshake correction module 50 is terminated in order to perform photographing according to the photographing signal. The photographing signal may be generated by a user by fully pressing the shutter release button (S2).

Although the handshake correction module 50 drives the vibration mode of the driving unit 55 to inform a user that a preprocessing operation has and/or may have failed in the present embodiment, the invention is not limited thereto. For example, when the preprocessing operation has been successfully performed, the driving unit 55 may also vibrate, albeit in a potentially different manner, to inform the user that the preprocessing operation has been successfully performed. Thus, the handshake correction module 50 may drive the vibration mode of the driving unit 55 in response to any number and/or type(s) of results (e.g., failure and/or success) of the preprocessing operation.

The handshake correction module 50 may, additionally or alternatively, perform handshake correction on a photographic image. Handshake correction is described in more detail with reference to FIG. 3.

Figure 3:
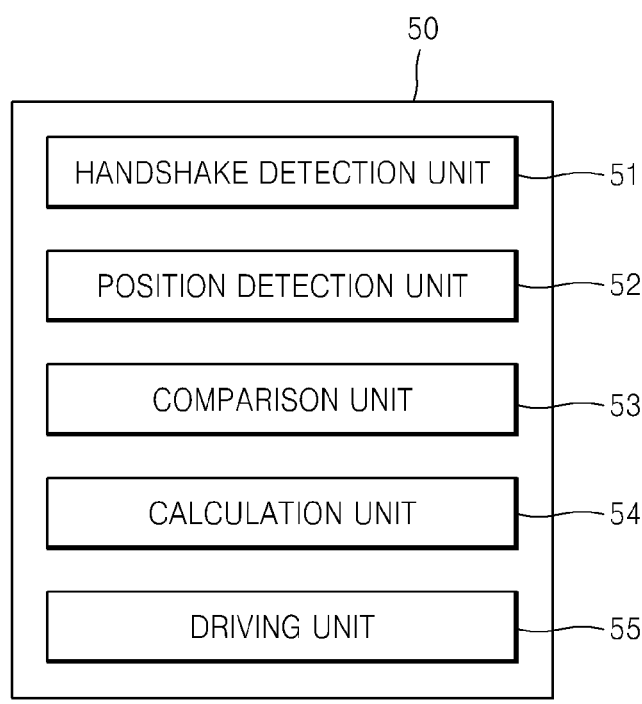
FIG. 3 is a detailed block diagram illustrating the example handshake correction module of FIG. 2.

FIG. 3 is a detailed block diagram illustrating the handshake correction module 50 of FIGS. 1 and 2. Referring to FIG. 3, the handshake correction module 50 includes a handshake correction detection unit 51 such as a gyroscopic sensor, a position detection unit 52 that detects a position of the optics 10 or an imaging element of the imaging device 20, a comparison unit 53 that compares a handshake signal detected by the handshake detection unit 51 with a reference handshake signal, and that compares a position signal detected by the position detection unit 52 with a reference position signal, a calculation unit 54 that calculates a handshake correction amount based on the handshake signal if the handshake signal and the position signal are greater than the reference handshake signal and the reference position signal, respectively, and the driving unit 55 that drives the optics 10 or the imaging element of the imaging device 20 according to the calculated handshake correction amount.

A handshake correction operation that is a main function of the handshake correction module 50 is performed on a photographic image generated according to a photographing signal. Because a person's hand may shake, move and/or vibrate with respect to at least two axes, for example, up and down and left and right, the handshake may be corrected by moving the driving unit 55 in the at least two axes. In some embodiments, the handshake may be corrected with respect to three axes, for example, up and down, left and right, and forward and back.

When the driving unit 55 of the handshake correction module 50 tactually notifies and/or alerts a person of a preprocessing result, (e.g., when the vibration mode is driven), the person holding the digital camera can tactually sense the vibrations. In some embodiments, the digital camera may be designed to vibrate with respect to only one axis to simplify driving of the driving unit 55.

Figure 4:
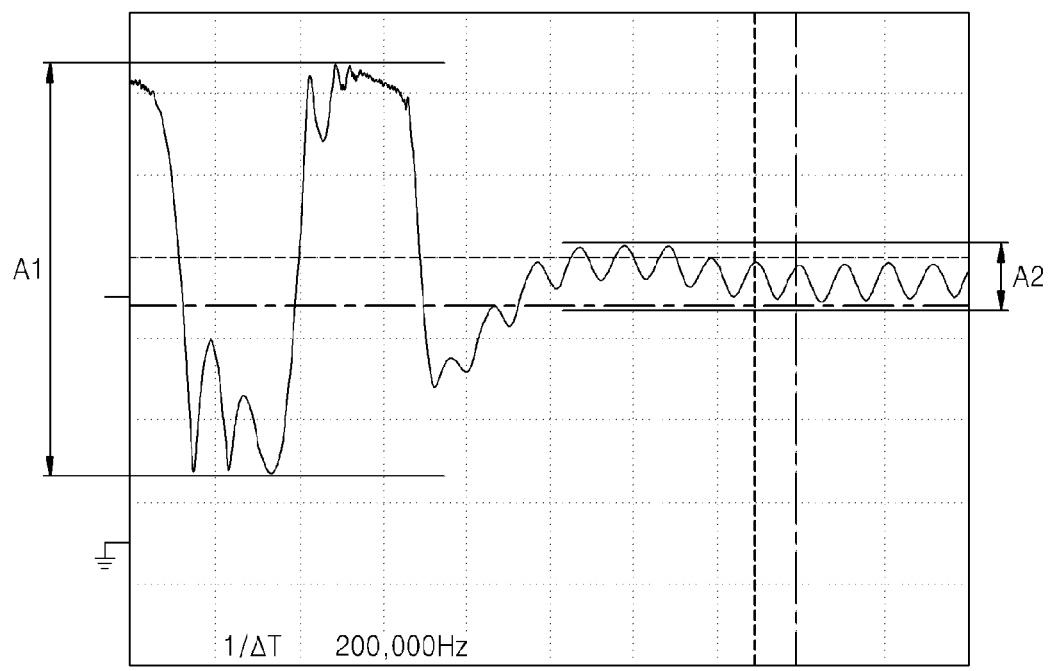
FIG. 4 is a graph illustrating an example vibration waveform of a driving unit of a handshake correction module in a vibration mode and in a handshake correction mode.

FIG. 4 is a graph illustrating an example vibration waveform of a driving unit (e.g., the example driving unit 55 of FIG. 5) of a handshake correction module in a vibration mode and in a handshake correction mode. Referring to FIG. 4, if a driving unit of the handshake correction module is vibrated at an amplitude A1 in the handshake correction mode to perform handshake correction, the driving unit of the handshake correction module is vibrated at an amplitude A2 in the vibration mode to tactually notify a user of a preprocessing result. In some embodiments, the amplitude A2 in the vibration mode is ⅕ of the amplitude A1 in the handshake correction mode. The amplitude A2 includes amplitudes that may be readily sensed by a user (e.g., a photographer) when the driving unit of the handshake correction module is driven at a frequency of 200 Hz.

Figure 5:
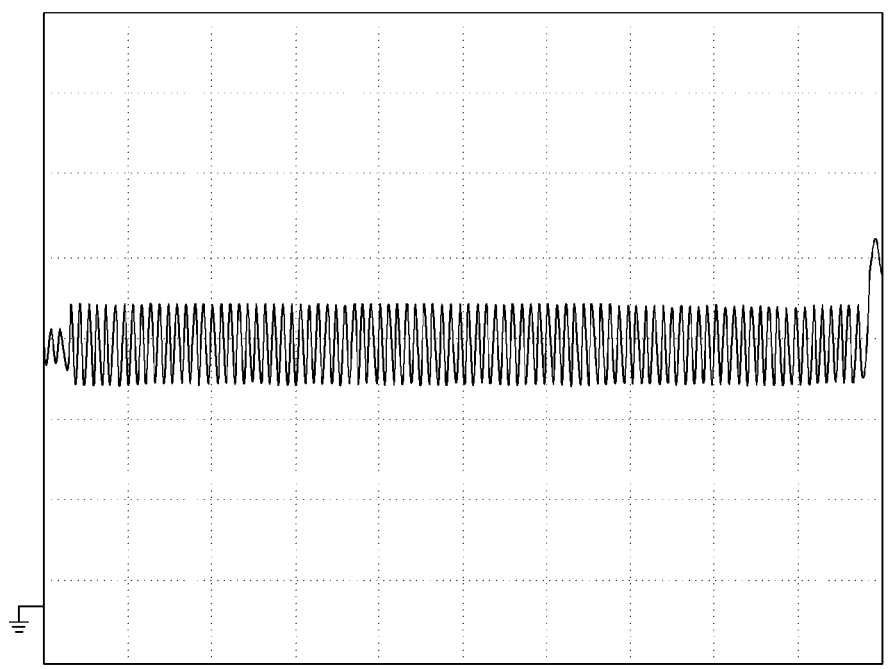
FIG. 5 is a graph illustrating an example vibration waveform of a driving unit of a handshake correction module in a vibration mode.

FIG. 5 is a graph illustrating an example vibration waveform of a driving unit of a handshake correction module in a vibration mode. Referring to FIG. 5, a driving unit (e.g., the example driving unit 55 of FIG. 5) of a handshake correction module may be utilized to deliver an alarm, alert and/or notification message to a user (e.g., a photographer) by being driven at a predetermined frequency during a specific period of time.

Figure 6:
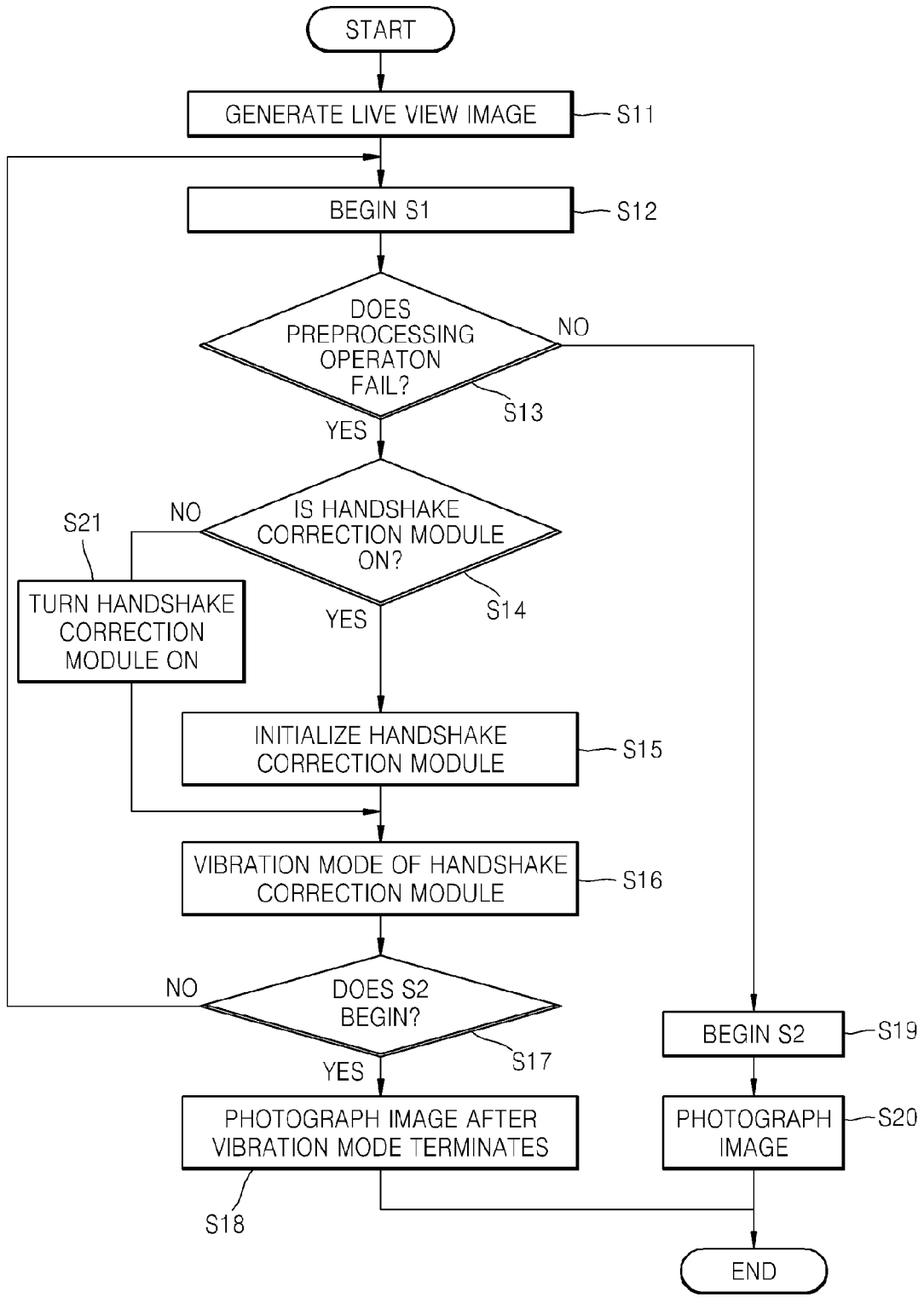
FIG. 6 is a flowchart illustrating a method of controlling a digital image processing apparatus, according to an embodiment.

FIG. 6 is a flowchart illustrating a method of controlling a digital image processing apparatus, according to an embodiment. Referring to FIG. 6, a live view image is generated (operation S11). For example, operation S1 described in a previous embodiment begins by half-pressing a shutter release button (operation S12). As described above, operation S1 may begin according to a user's input such as a touch operation or begin automatically according to a specific condition.

In operation 11, a preprocessing operation is performed on the live view image. The preprocessing operation may include AF, AE control, AWB control, auto-flash on/off, subject recognition, scene recognition, etc.

If the preprocessing operation has and/or may have failed (operation 13), it is determined whether a handshake correction module is to be turned on (operation 14).

If it is determined that the handshake correction module is to be turned on, a handshake correction module (e.g., the example handshake correction module 50) is initialized (operation 15). For example, a driving unit of the handshake correction module (e.g., the example driving unit 55) may be moved to a specific position, for example, a center position. In some embodiments, the handshake correction module is initialized in order to prevent a vibration source from being positioned in a place that is not suitable for driving a vibration mode.

The driving unit of the handshake correction module drives the vibration mode (operation 16). In the vibration mode, the driving unit may vibrate with respect to a single axis, in some embodiments.

It is determined whether operation S12 described in a previous embodiment begins by fully pressing the shutter release button (operation S17). As described above, operation S2 may begin according to a user's input such as a touch operation or begin automatically.

If it is determined that operation S2 is to begin, an image is captured after the vibration mode is terminated (operation S18). Thereafter, a handshake correction operation may be performed on the captured image.

If the preprocessing operation succeeds in operation S13, operation S2 may begin by fully pressing the shutter release button (operation S19). A user may capture an image when operation S2 begins (operation S20).

If the handshake correction module is not turned on in operation S14, the handshake correction module is turned on (operation S21), and then the vibration mode may be driven (operation S16).

Figure 7:
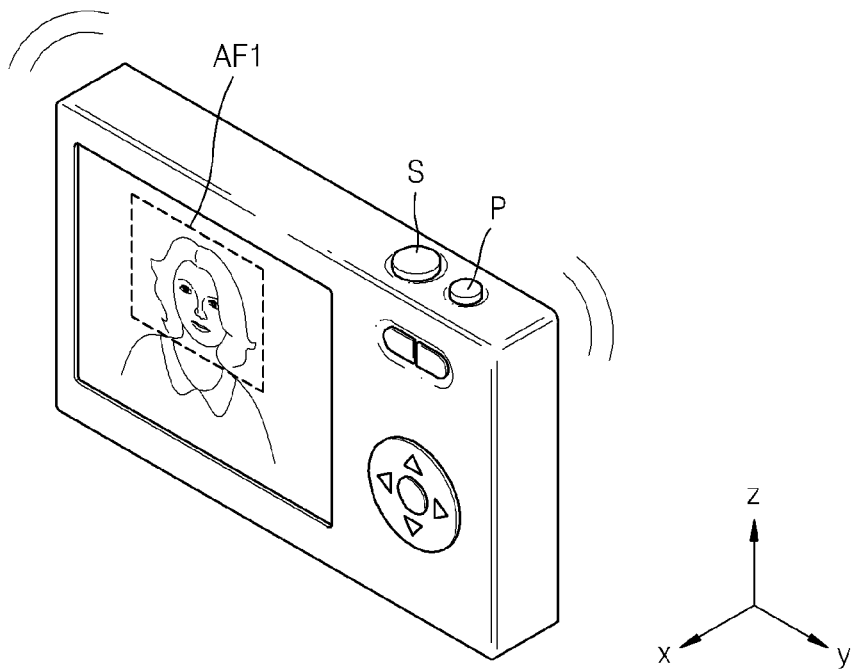
FIGS. 7 and 8 illustrate digital cameras that are examples of a digital image processing apparatus to which the example method of controlling the digital image processing apparatus of FIG. 6 is applied, according to embodiments.
Figure 8:
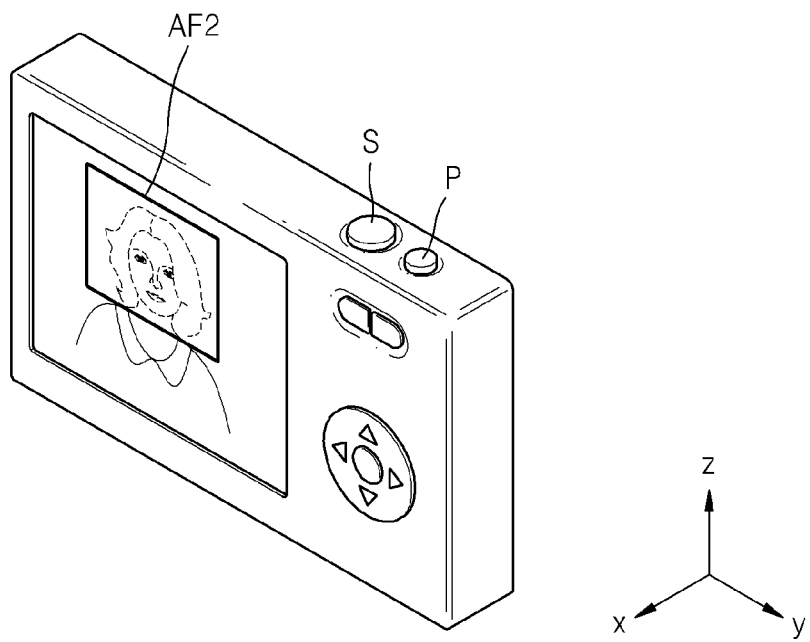

FIGS. 7 and 8 illustrate a digital camera that are examples of a digital image processing apparatus to which the disclosed methods of controlling the digital image processing apparatus of FIG. 6 may be applied.

Referring to FIG. 7, when a user half-presses a shutter release button, AF is performed as a preprocessing operation, and the digital camera vibrates in order to notify the user about an out-of-focus state of a focus region AF1. In more detail, a driving unit of a handshake correction module (e.g., the example driving unit 55 of the example handshake correction module 50) is driven. Thus, the user is notified of and/or alerted to the out-of-focus state of the focus region AF1 and may, for example, half-press the shutter release button to repeat AF. As a result, referring to FIG. 8, since an in-focus state of a focus region AF2 does not cause the digital camera to vibrate, the user may immediately capture an image by fully pressing the shutter release button.

Although a user is notified that a preprocessing operation has failed, for example, that AF has failed, by vibration of a driving unit of a handshake correction module in the present embodiment, the invention is not limited thereto. For example, the user may be notified whether other preprocessing operations have been successfully performed by vibration of the driving unit of the handshake correction module.

According to the embodiments, a user may tactually recognize a result of a preprocessing operation, which allows the user to more precisely confirm the result of the preprocessing operation compared to confirming using a screen of limited resolution. Thus, the user can more readily obtain desired images.

Further, a given handshake correction module is used to sense vibrations, thereby allowing a compact photographing apparatus that can generate various user alarm messages to be manufactured.

In the present embodiment, a user is tactually informed of results of preprocessing operations performed before photographing begins, thereby providing a digital image processing apparatus capable of precisely informing the results to a user irrespective of surroundings and a method of controlling the digital image processing apparatus.

A vibration mode in which a driving source of a conventionally embedded handshake correction module is used is realized to instantly inform a user of results in a tactual manner. Thus, the user can instantly recognize results of preprocessing operations using a compact digital image photographing apparatus.

The methods disclosed herein may be implemented through machine-readable instructions recorded on a tangible article of manufacture such as a computer-readable storage media and executed by one or more processors. The machine-readable instructions may include individual or any combination of program instructions, data files, and/or data structures. The program instructions recorded on the computer-readable storage media can be specially designed and/or constructed as known to and/or used by a person skilled in the art of computer software. Examples of the computer readable storage media include magnetic media (e.g., hard disks, floppy disks, magnetic tapes, etc), optical recording media (e.g., CD-ROMs, or DVDs), magneto-optical media such as floppy disks, and/or hardware devices specially configured to store and perform program instructions (ROM, RAM, flash memories, etc). Computer-readable storage media may be distributed over network coupled computer systems so that the machine-readable instructions are stored and/or executed in a distributed fashion. This media can be read by the computer, stored in its memory, and executed by a processor. Examples of program instructions include machine language codes produced by a compiler and/or high-level language codes that can be executed by a computer using an interpreter. The hardware devices can be constructed as one or more software modules in order to perform the operations according to the present disclosure, and vice versa.

Also, using the disclosure herein, programmers of ordinary skill in the art to which the invention pertains can easily implement functional programs, codes, and code segments for making and using the invention.

The embodiments disclosed herein may be described in terms of functional block components and/or methods. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of this disclosure are implemented using software programming and/or software elements, the disclosed embodiments may be implemented with any programming or scripting language such as C, C++, Java, assembler, or the like, with the various algorithms being implemented with any combination of data structures, objects, processes, routines and/or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of the methods described herein can be performed in any suitable order unless otherwise indicated herein and/or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosed embodiments, reference has been made to the embodiments illustrated in the drawings, and specific language has been used to describe these embodiments. However, no limitation of the scope of the claimed inventions is intended by this specific language, and the claimed inventions should be construed to encompass all embodiments that would normally occur to one of ordinary skill in the art. The terminology used herein is for the purpose of describing the particular embodiments and is not intended to be limiting of embodiments of the claimed inventions.

The use of any and all examples, or exemplary language (e.g., "such as") provided herein, is intended merely to better illuminate the claimed inventions and does not pose a limitation on the scope of the claimed inventions unless otherwise claimed. Numerous modifications and adaptations will be readily apparent to those of ordinary skill in this art without departing from the spirit and scope of the claimed inventions. Therefore, the scope of the claimed inventions is defined not by the detailed description but includes all equivalents and differences within the scope of the present disclosure.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While digital photographing apparatus and methods have been particularly shown and described with reference to exemplary embodiments thereof, it will be understood by those of ordinary skill in the art that various changes in form and details may be made therein without departing from the spirit and scope of the disclosure and/or as defined by the following claims or their equivalents.

What is claimed is:

1. A method of controlling a digital image processing apparatus, the method comprising:
   generating a live view image; performing a preprocessing operation on the live view image;
   driving a vibration mode of a handshake correction module in response to a result of the preprocessing operation;
   wherein the driving of the vibration mode of the handshake correction module comprises vibrating a driving unit of the handshake correction module at a predetermined amplitude and frequency for a predetermined period of time; and
   if a photographing signal is input during operation of the driving of the vibration mode, generating a photographic image after terminating the vibration mode of the handshake correction module.

2. The method of claim 1, wherein the processing operation comprises at least one of auto-focusing, auto-exposure control, auto-white balance (AWB) control, auto-flash control, or subject recognition.

3. The method of claim 1, further comprising, if the preprocessing operation has failed, initializing the vibration mode of the handshake correction module.

4. The method of claim 3, wherein the initializing of the vibration mode of the handshake correction module comprises moving a driving unit of the handshake correction module to a specific position.

5. The method of claim 1, wherein, if the predetermined frequency is 200 cycles per second (Hz), the predetermined amplitude is below ⅕ of a maximum handshake correction amplitude of the handshake correction module.

6. The method of claim 1, wherein, if the photographic image is input during the driving of the vibration mode of the handshake correction module, the photographic image is generated after stopping the vibration mode of the handshake correction module.

7. The method of claim 1, further comprising performing a handshake correction operation on the photographic image.

8. The method of claim 7, wherein the driving of the vibration mode of the handshake correction module comprises vibrating a driving unit of the handshake correction module with respect to a single axis, and
wherein the performing of the handshake correction operation comprises moving the driving unit of the handshake correction module with respect to plural axes.

9. A digital image processing apparatus comprising:
a live view image generation unit for generating a live view image; a preprocessing unit to perform a preprocessing operation on the live view image;
a handshake correction module to drive a vibration mode in response to a result of the preprocessing operation;
wherein the handshake correction module is to vibrate a driving unit thereof at a predetermined amplitude and frequency for a predetermined period of time; and
a photographic image generation unit to, if a photographing signal is input during vibration of the driving unit, generate a photographic image after terminating the vibration mode of the handshake correction module.

10. The digital image processing apparatus of claim 9, wherein the processing unit performs at least one of auto-focusing, auto-exposure control, auto-white balance (AWB) control, auto-flash control, or subject recognition.

11. The digital image processing apparatus of claim 9, wherein the handshake correction module is to drive the vibration mode after initializing the vibration mode of the handshake correction module.

12. The digital image processing apparatus of claim 11, wherein the handshake correction module is to move a driving unit thereof to a specific position.

13. The digital image processing apparatus of claim 1, wherein, if the predetermined frequency is 200 cycles per second (Hz), the predetermined amplitude is below ⅕ of a maximum handshake correction amplitude of the handshake correction module.

14. The digital image processing apparatus of claim 9, wherein, if the photographing image is input during driving of the vibration mode of the handshake correction module, the photographing image generation unit is to generate the photographing image after stopping the vibration mode of the handshake correction module.

15. The digital image processing apparatus of claim 9, wherein the handshake correction module is to perform a handshake correction operation on the photographing image.

16. The digital image processing apparatus of claim 9, wherein the handshake correction module is to drive the driving unit in the vibration mode with respect to a single axis and in a handshake correction mode with respect to plural axes.

* * * * *